United States Patent
Nihei (10) Patent No.: US 6,793,420 B2
(45) Date of Patent: Sep. 21, 2004

(54) PRINTING SYSTEM

(75) Inventor: Kaname Nihei, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/614,027

(22) Filed: Jul. 8, 2003

(65) Prior Publication Data

US 2004/0009023 A1 Jan. 15, 2004

(30) Foreign Application Priority Data

Jul. 12, 2002 (JP) ........................................ 2002-203411

(51) Int. Cl.[7] .................................................. B41J 5/30
(52) U.S. Cl. .............................. 400/61; 400/62; 400/76; 358/1.9
(58) Field of Search ................................ 400/61–63, 70, 400/76; 358/1.9, 2.1, 2.99–3.02, 3.1

(56) References Cited

U.S. PATENT DOCUMENTS 6,268,932 B1 * 7/2001 Lee et al. .................... 358/1.9
6,473,199 B1 * 10/2002 Gilman et al. ............... 358/1.9
2004/0061884 A1 * 4/2004 Yamaguchi .................. 358/1.9

* cited by examiner

*Primary Examiner*—Minh H Chau
(74) *Attorney, Agent, or Firm*—Sughrue Mion, PLLC (57) ABSTRACT

If a density adjustment command is applied to a control apparatus in a printing system having a plurality of printers, each of the printers outputs sheets of density adjustment paper on which has been recorded identification information (a color) indicating which printer produced the output, and a color for performing a density adjustment. Any one of the sheets of density adjustment paper is set in a densitometer. The identification information and the density-adjustment color on the set density adjustment paper are read by the densitometer and applied to the control apparatus. Density adjustment data obtained from the density-adjustment color is transmitted to a printer specified by the identification information of the density adjustment paper. The printer that has received the density-adjustment data performs a density adjustment based upon the density adjustment data. Density can be adjusted appropriately even though the system includes a plurality of printers.

2 Claims, 7 Drawing Sheets

PRINTING SYSTEM

BACKGROUND OF THE INVENTION

1. Field of the Invention

This invention relates to a printing system that includes a plurality of printers, a densitometer and a printer control unit, and to a printer.

2. Description of the Related Art

Controlling a plurality of printers using a single printer control unit in order to output a number of prints in a short time is conceivable. In a case where the same image or the like is printed using a plurality of printers, often it is required that the images printed by each of the printers have a density that is constant. The density of a print that has been output from a printer is measured by a densitometer in order to check whether the density is constant or not. The printer is adjusted in such a manner that the measured density will take on a predetermined value.

When images or the like are printed by a plurality of printers, however, the user may not be able to tell from which printer an image was output. Hence there are occasions where adjustment of printer density cannot be performed using prints that have been output from a plurality of printers.

SUMMARY OF THE INVENTION

Accordingly, an object of the present invention is to adjust the density of each of a plurality of printers in a system comprising a plurality of printers.

According to a first aspect of the present invention, the foregoing object is attained by providing a system comprising a plurality of printers, a densitometer and a printer control unit.

Each printer of the plurality of printers has a printer head for printing at a density that is based upon print-density adjustment data applied thereto, and a first controller (first control means) for controlling the printer head so as to print density adjustment paper that includes unique identification information, which is different from that of other printers among the plurality of printers, and density measurement information.

The densitometer has a first reading unit (means) for reading the identification information on the density adjustment paper that has been output from the printer and outputting data representing the read identification information, and a second reading unit (means) for reading the density measurement information on the density adjustment paper that has been output from the printer and outputting data representing a read density measurement value.

Furthermore, the printer control unit has a generating unit (means) for generating print-density adjustment data based upon density measurement data that has been output from the second reading unit (means) of the densitometer, and a second controller (second control means) for applying the print-density adjustment data generated by the generating unit (means) to a printer, which is specified by identification information data that has been output from the first reading unit (means), from among the plurality of printers.

In accordance with the first aspect of the present invention, each printer of a plurality of printers outputs density adjustment paper that contains unique identification information (identification information represented by a unique color, characters or bar code, etc.), different from other printers of the plurality of printers, and density measurement information (a gray color, etc., having a prescribed density). When the density adjustment paper is output from a printer, the density measurement information and identification information on the density adjustment paper are read by the densitometer. Data representing the read density measurement information and data representing the identification information is output from the densitometer and applied to the printer control unit.

Density adjustment data is generated based upon the density measurement data output from the densitometer. The generated density adjustment data is applied to the printer specified by the data representing identification information output from the densitometer. A density adjustment is carried out in accordance with the density adjustment data in the printer to which the density adjustment data has been applied.

Even though the printing system includes a plurality of printers, the user is capable of performing density adjustment of a printer using the corresponding density adjustment paper without needing to be aware of which printer output the density adjustment paper, which is output from respective ones of the printers. Density adjustment of each printer of a plurality of printers can be executed comparatively accurately.

The first controller (first control means) of each printer of the plurality of printers controls the printer head so as to print density adjustment paper that includes, e.g., printer collateral information (output-timing information) in addition to the identification information and density measurement information.

In this case, the densitometer includes a third reading unit (means) for reading the printer collateral information of the density adjustment paper that has been output from the printer, and outputting data representing the read output-timing information. Further, the printer control unit includes an alert device (means) for issuing an alert when printer collateral information that has been output from the third reading unit of the densitometer is not printer collateral information that was obtained from density adjustment paper printed last.

By way of example, even if density adjustment paper has been output a plurality of times on different days, it can be determined from the collateral printer information that a sheet of density adjustment paper was one obtained when a density adjustment was being attempted. As a result, a density adjustment can be performed using density adjustment paper for which a density adjustment was being attempted.

The printers, printer control unit and densitometer constructing the above-described printing system may each be stand-alone devices.

For example, in the case of the printer, the printer would comprise a printer head for printing at a density that is based upon print-density adjustment data applied thereto, and a controller (control means) for controlling the printer head so as to print density adjustment paper that includes different unique identification information and density measurement information.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
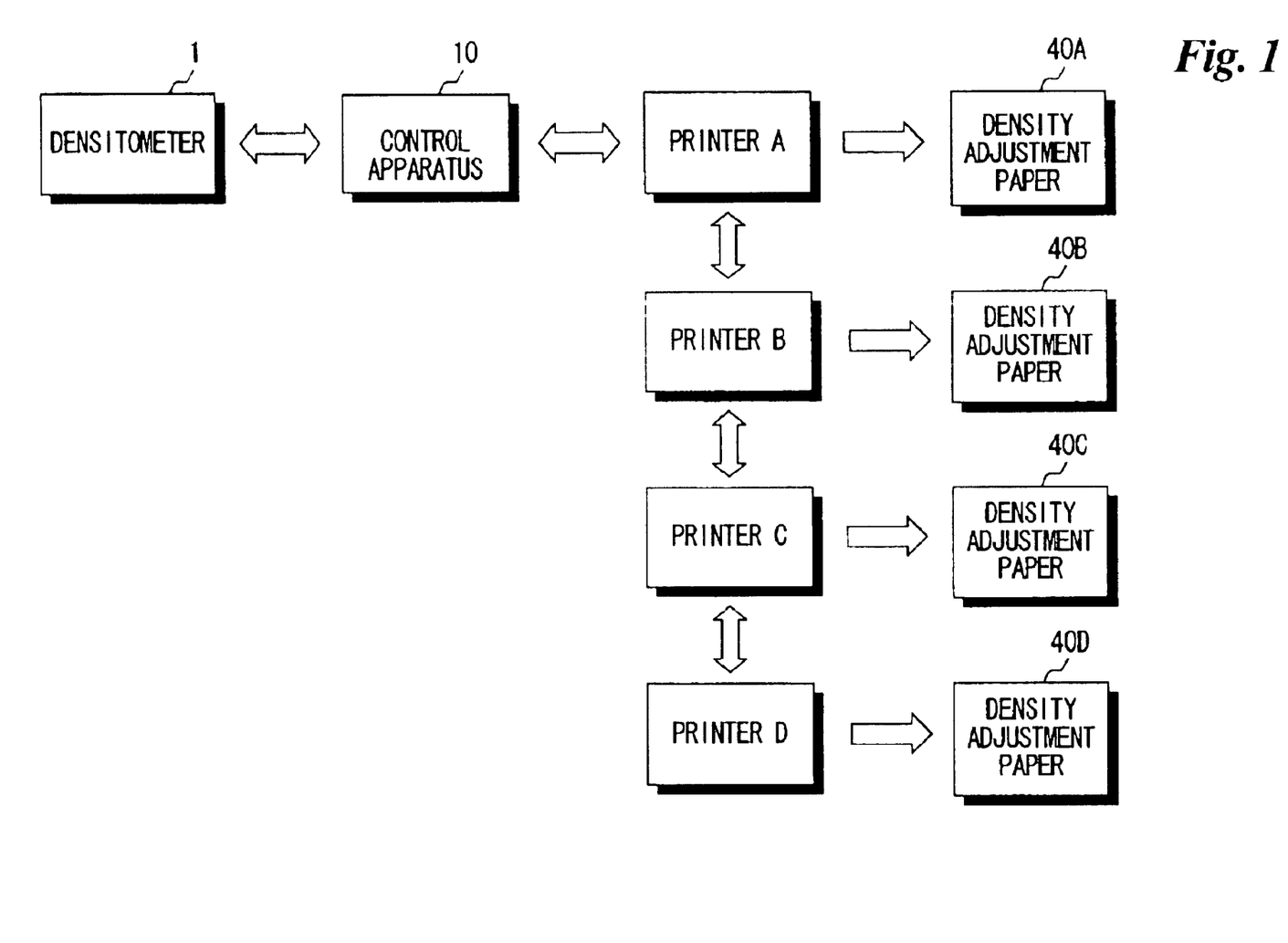
FIG. 1 is a block diagram illustrating the electrical configuration of a printing system according to an embodiment of the present invention.

FIG. 1 is a block diagram illustrating the overall electrical configuration of a printing system according to an embodiment of the present invention.

As shown in FIG. 1, the printing system includes a densitometer 1, a control apparatus 10 and a four printers A to D. The densitometer 1 and control apparatus 10 are connected by a cable that is compliant with RS-232C, and the control apparatus 10 and printer A are connected by an SCSI (Small Computer System Interface) cable. The printers A to D are connected in the form of a so-called daisy chain.

The printing system is so adapted that the density of prints that are output from the printers A to D can be adjusted to a prescribed density. Sheets of density adjustment paper 40A to 40D used in the adjustment of density are output from the printers A to D, respectively. Recorded on each sheet of density adjustment paper are identification information indicating which of the printers A to D printed out the sheet, density measurement information used in adjustment of density, and output-timing information for detecting the timing at which the sheet of density adjustment paper was printed out. The various types of information are read by the densitometer 1 and data indicating the various information is applied to the control apparatus 10. On the basis of the density measurement information, the control apparatus 10 generates density adjustment data for controlling, to a predetermined density, the density of a print that is output from a printer. The generated density adjustment data is transmitted to a printer specified from among the printers A to D by the identification information given. Density adjustment processing is executed at the printer to which the density adjustment data was applied by the control apparatus 10. Even though the system includes the plurality of printers A to D, therefore, the density of the corresponding printer can be performed in accurate fashion. The details of this operation will become more evident from the description that follows.

Figure 2:
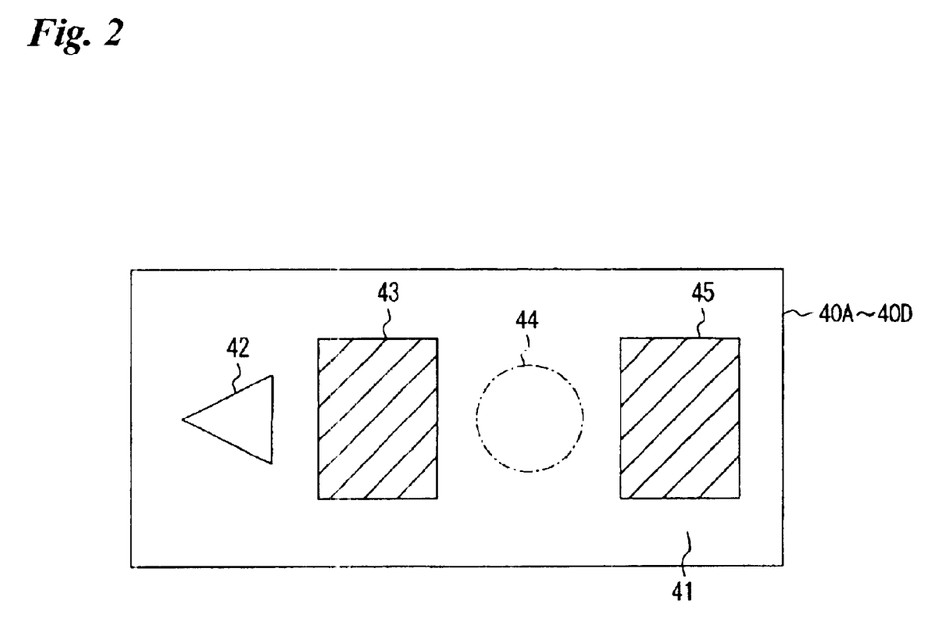
FIG. 2 is a diagram showing an example of density adjustment paper according to this embodiment.

FIG. 2 shows an example of the density adjustment paper 40A to 40D output from the printers A to D.

The overall surface 41 of the density adjustment paper 40A to 40D is gray in color, which is indicative of a reference density. The density adjustment paper 40A to 40D is formed to have each of the following areas:

Loading Guide Area 42

This is an area that serves as a guide when the density adjustment paper 40A to 40D is loaded in the densitometer.

Output-Timing Information Area 43

In this embodiment, density adjustment paper, which is printed at a timing at which a density-adjustment-paper output command is applied to the printers A to D from the control apparatus 10, contains output-timing information that indicates, by its color, the fact that printers produced outputs at the same timing. The output-timing information differs every four cycles. If sheets of density adjustment paper were output in the same cycle, then they will be the same regardless of which of the printers A to D produced them as outputs. Output-timing information of the four colors red, blue, green and black is recorded in the output-timing information area 43 of the sheets of density adjustment paper output in first, second, third and fourth cycles, respectively.

Density Measurement Area 44

This is an area in which color is measured by the densitometer 1. It goes without saying that the color in the area 44 is the reference color gray.

Identification Information Area 45

A color indicating which printer among the printers A to D output the sheet of density adjustment paper is recorded in this area. If the colors recorded in the identification information area 45 are red, blue, green and black, then this will indicate that the sheets of density adjustment paper 40A, 40B, 40C and 40D were output from the printers A, B, C and D, respectively.

Figure 3:
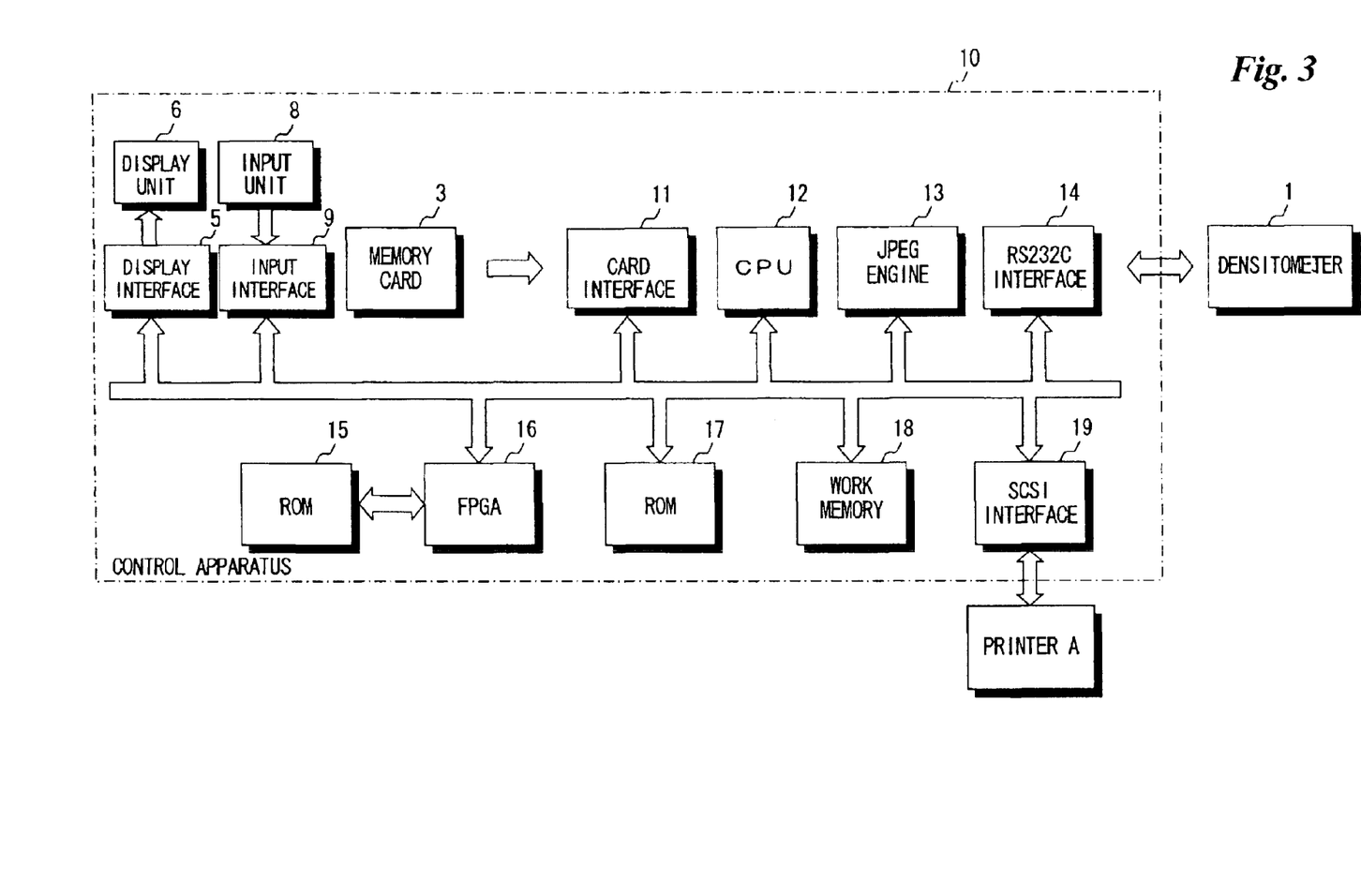
FIG. 3 is a block diagram illustrating the electrical structure of a control apparatus according to this embodiment.

FIG. 3 is a block diagram illustrating the electrical structure of the control apparatus 10.

The overall operation of the control apparatus 10 is controlled by a CPU 12.

A display unit 6 is connected to the control apparatus 10 via a display interface 5. The control apparatus 10 includes an input unit 8 for applying various commands. The commands from the input unit 8 are input to the control apparatus 10 via an input interface 9. Furthermore, a card interface 11 for inserting a memory card 3 into the control apparatus 10 is included. Image data that has been recorded on the memory card 3 is read by the card interface 11. A JPEG (Joint Photographic Experts Group) engine 13 compresses image data according to the JPEG standard and expands JPEG image data that has been compressed. The densitometer 1 and control apparatus 10 are connected by an RS232C cable via an RS232C interface 14. An FPGA (Field Programmable Gate Array) 16 executes prescribed control, such as timing control, based upon a program that has been stored in a ROM 15 connected thereto. An operating program for operating the control apparatus 10 has been stored in a ROM 17. A work memory 18 temporarily stores prescribed data necessary for the control operation. The control apparatus 10 and printer A are connected by an SCSI cable via an SCSI interface 19.

When images represented by image data that has been stored on the memory card 3 are printed using the printers A to D, compressed image data that has been recorded on the memory card 3 is specified by the input unit 8. The compressed image data specified is expanded by the JPEG engine 13. The compressed image data thus expanded is applied to printer A, etc., from the SCSI interface 19. The image represented by the image data is printed at the printer A, etc.

The density of each of the printers A to D also can be adjusted in the manner set forth above. If a density adjustment command is entered from the input unit 8, the command is applied to printers A to D from the control apparatus 10, whereupon the printers A to D output the sheets of density adjustment paper 40A to 40D, respectively. The density measurement information on the output sheets of density adjustment paper 40A to 40D is read successively by the densitometer 1. Data representing the density measurement information is output from the densitometer 1 and is input to the control apparatus 10 via the RS232C interface 14. Density adjustment data for adjusting the density of each of the printers A to D is generated from the entered data representing the density measurement information, etc. The density adjustment data generated is applied to the corresponding printer among the printers A to D. Density adjustment of the printers A to D is then carried out.

The densitometer 1 has light-emitting diodes for emitting light of the colors cyan, magenta and yellow (or red, green and blue). The light-emitting diodes are positioned so as to illuminate the areas 43, 44 and 45 of the sheets of density adjustment paper 40A to 40D, respectively, with light. The densitometer 1 has photodiodes corresponding to areas 43, 44 and 45. Light reflected from the areas 43, 44 and 45 is received by respective ones of photodiodes. Photoreception signals from the photodiodes are converted to data, namely data representing output-timing information, data representing density measurement and data representing identification information, and this data is applied to the control apparatus 10.

Figure 4:
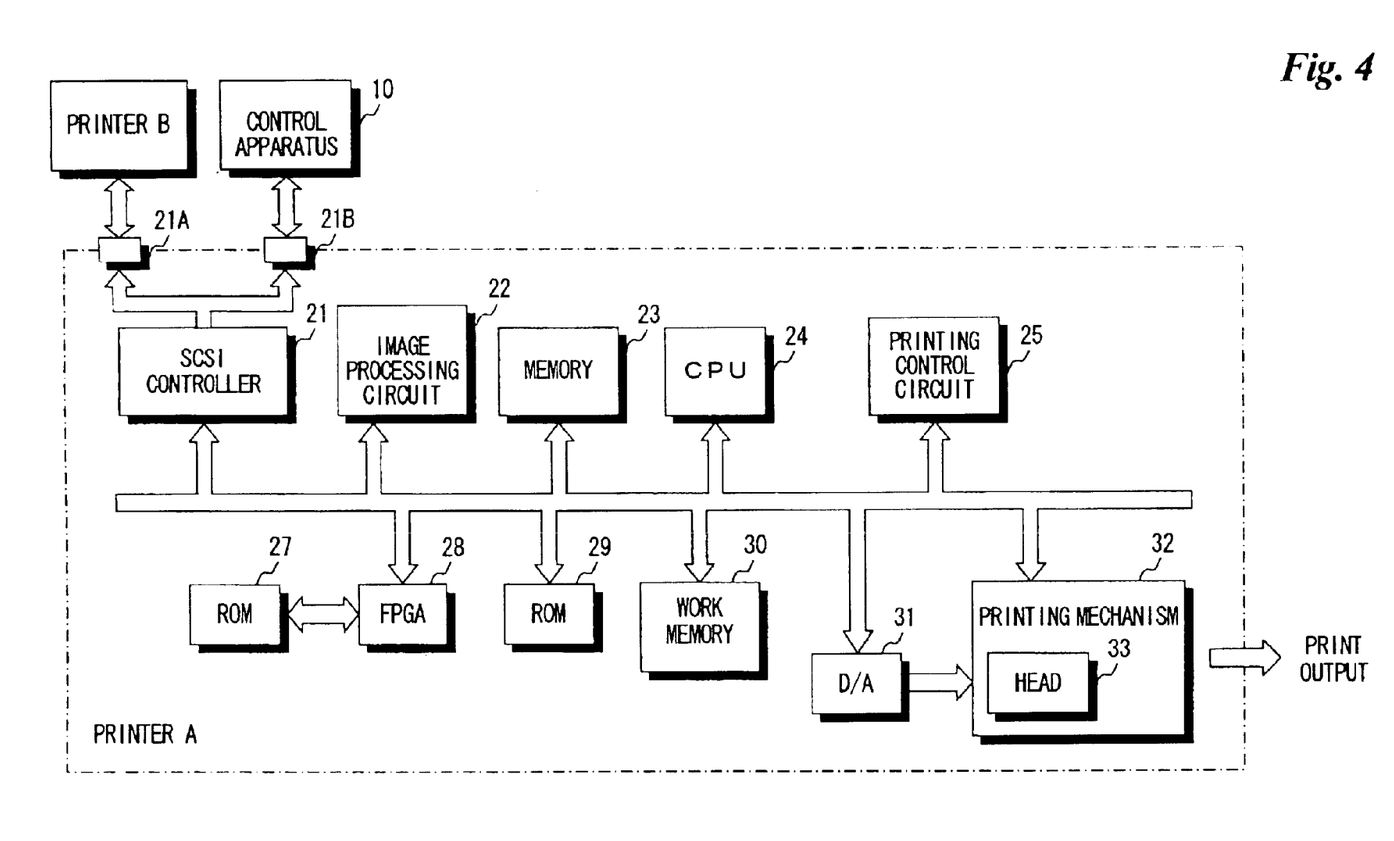
FIG. 4 is a block diagram illustrating the electrical structure of a printer according to this embodiment.

FIG. 4 is a block diagram illustrating the electrical structure of printer A. Printers B to D have a structure identical with that of printer A.

The overall operation of printer A is controlled by the CPU 23.

Printer A has an SCSI controller 21 to which connectors 21A and 21B are connected. Printer B and the control apparatus 10 are connected to printer A at the connectors 21A and 21B, respectively. It will readily be understood that the other printers B to D are connected to other printer without being connected to the control apparatus 10 (see FIG. 1).

Printer A includes an image processing circuit 22 for executing prescribed processing such as a color adjustment of an image represented by image data provided by the control apparatus 10, a memory 23 for storing data temporarily, and a printing control circuit 25 for controlling a printing mechanism 32 that performs printing. As in the manner of the control apparatus 10, printer A further includes an FPGA 28 for performing an operation based upon a program that has been stored in a ROM 27, and a work memory 30 for storing data temporarily.

When image data enters from the control apparatus 10, the entered image data is subjected to image processing in the image processing circuit 22. Image data that is output from the image processing circuit 22 is applied to the printing mechanism 32, which is controlled by the printing control circuit 25. The image represented by the image data that entered from the control apparatus 10 is output as a print using a head 33.

When density adjustment data enters from the control apparatus 10, the data is converted to an analog signal in a D/A converting 31. The head 33 of the printing mechanism 32 is adjusted by the analog signal obtained by the conversion and therefore the density of the print output from printer A is adjusted.

Figure 5:
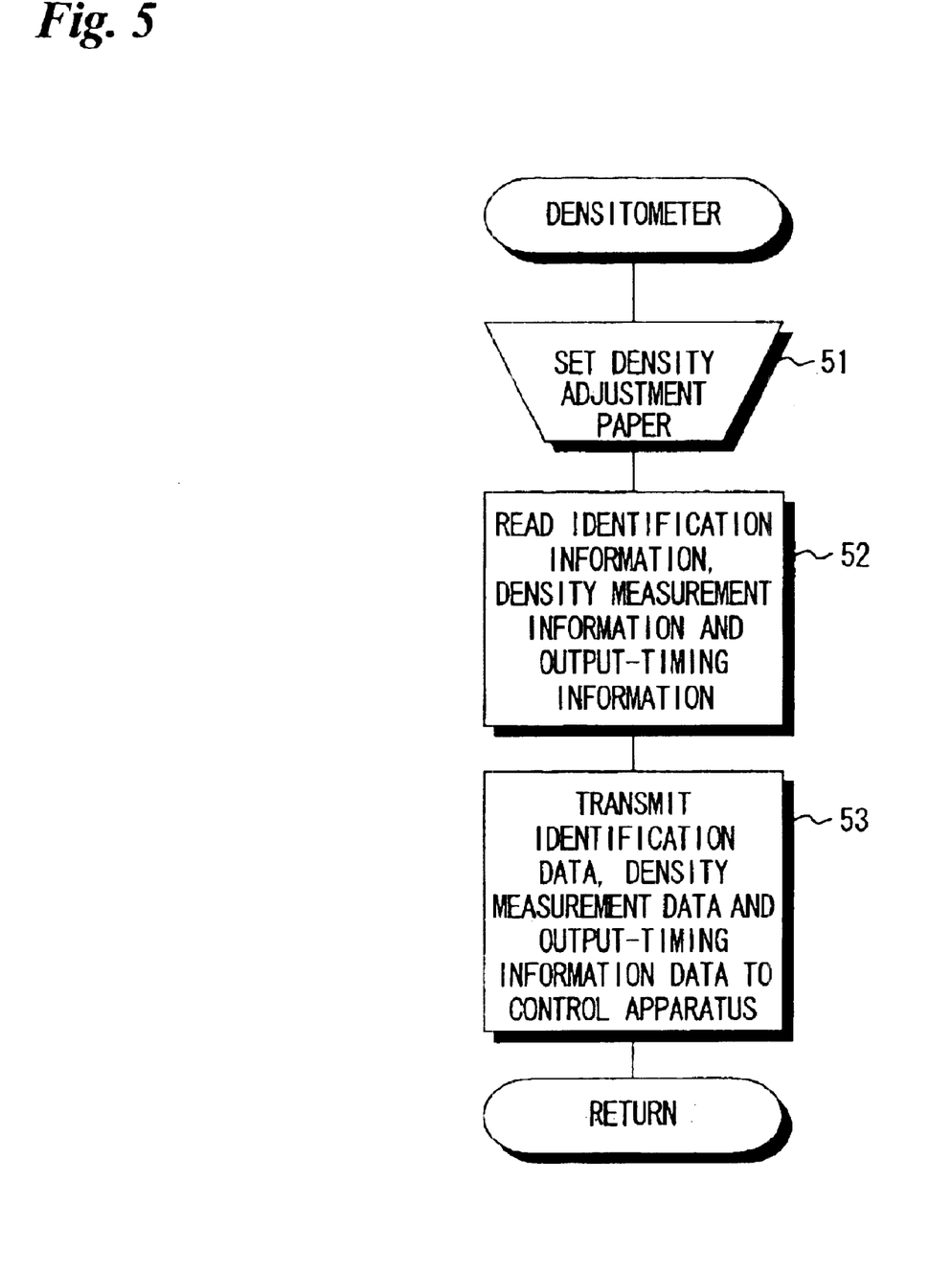
FIG. 5 is a flowchart illustrating processing executed by the densitometer.
Figure 6:
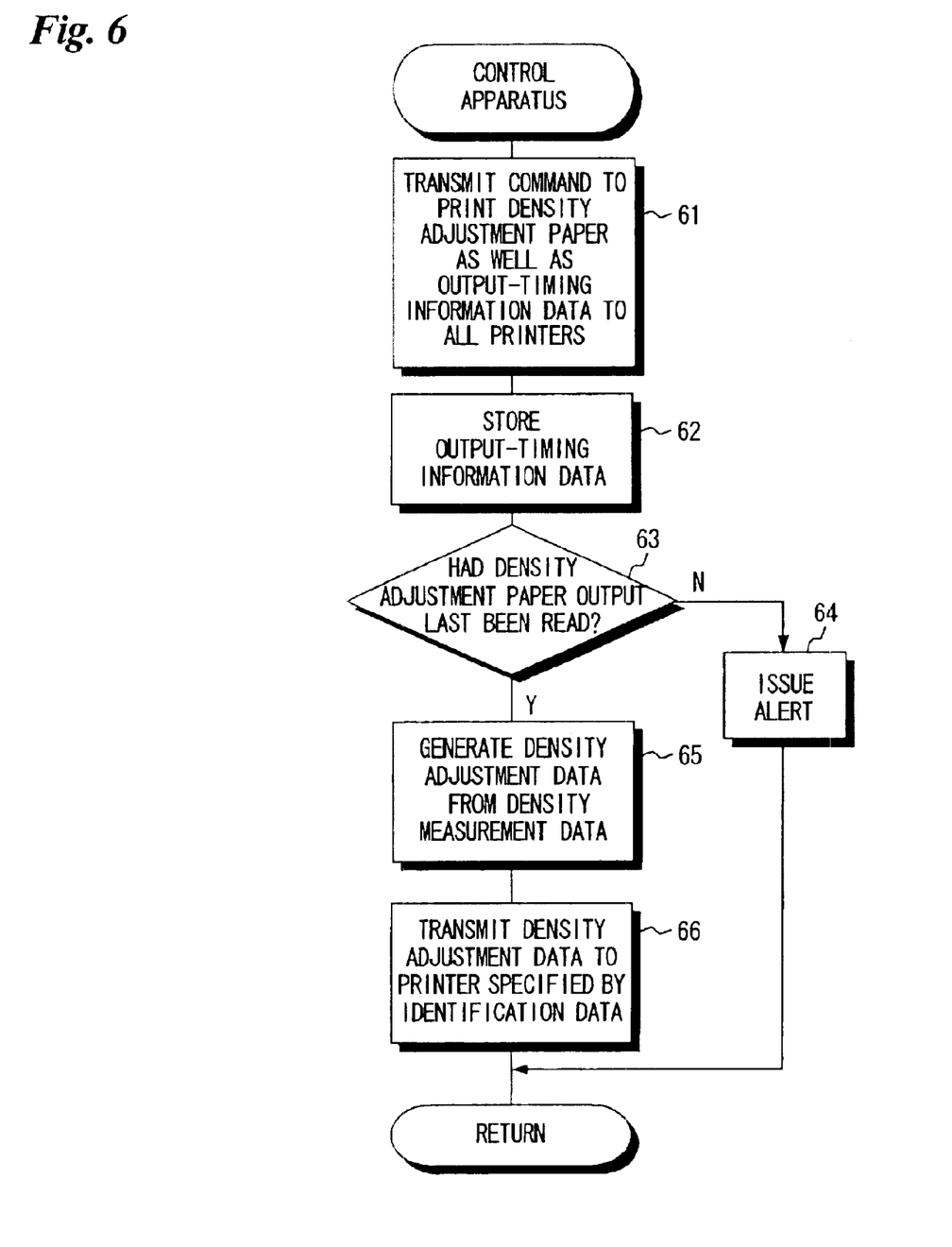
FIG. 6 is a flowchart illustrating processing executed by the control apparatus.
Figure 7:
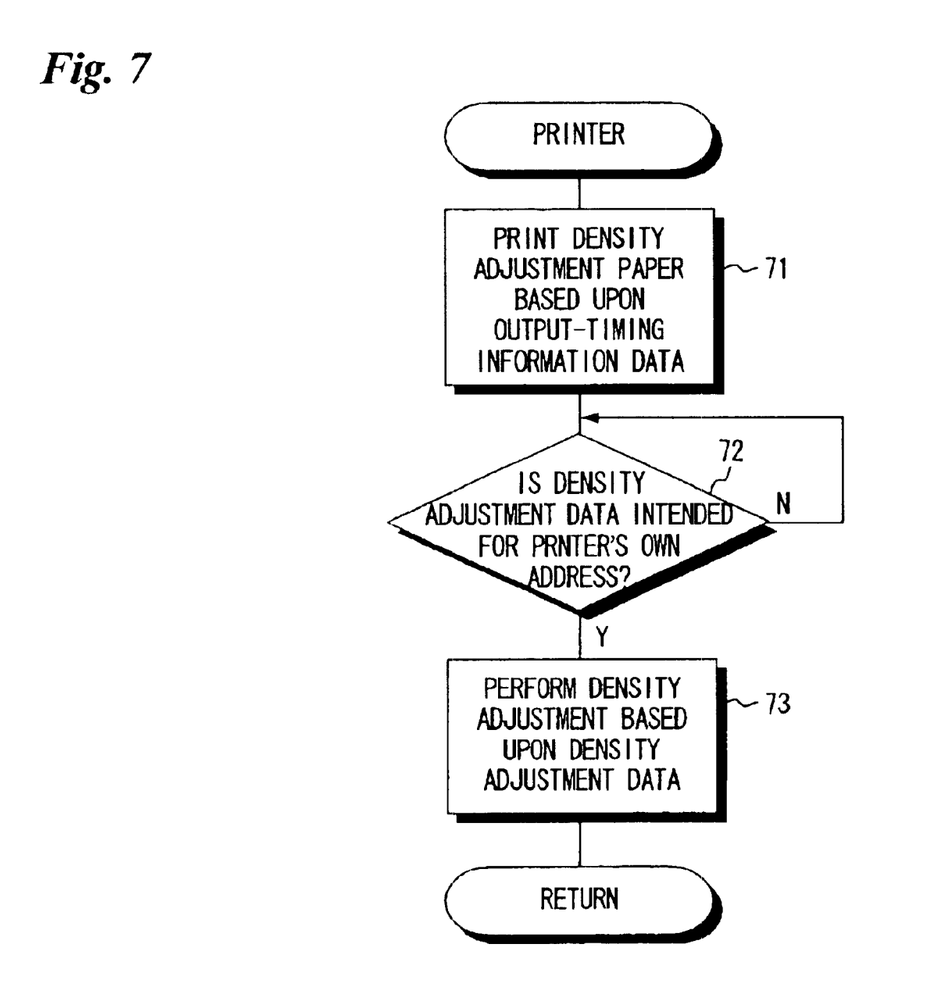
FIG. 7 is a flowchart illustrating processing executed by the printer.

FIGS. 5 to 7 are flowcharts illustrating processing executed by the printing system of this embodiment. FIG. 5 illustrates the processing executed by the densitometer 1, FIG. 6 illustrates the processing executed by the control apparatus 10, and FIG. 7 illustrates the processing executed by the printer.

In the printing system according to this embodiment, the output-timing information area 43 is formed on the density adjustment paper 40A to 40D output from the printers A to D, as mentioned above. Output-timing information represented by the color red, blue, tree or black is recorded in the output-timing information area 43. If the user inputs a density adjustment command to the control apparatus 10, the latter responds to the command by sending all of the printers A to D a command, which specifies that density adjustment paper should be output, and data representing the output-timing information (data indicating whether the output-timing information of the density adjustment paper to be output is of the color red, blue, green or black) (step 61 in FIG. 6). The transmitted data representing the output-timing information is stored in the work memory 18 of control apparatus 10 (step 62 in FIG. 6).

When the command to output the density adjustment paper and the data representing the output-timing information that have been output from the control apparatus 10 enter the printers A to D, the printers A to D respectively output the sheets of density adjustment paper 40A to 40D in which the output-timing information based upon the data representing the output-timing information is recorded in the output-timing information area 43 and the identification information for identifying each printer is recorded in the identification information area 45 (step 71 in FIG. 7). By way of example, if the density adjustment command is the first issuance of this command, the same color (e.g., red) will be recorded in all of the output-timing information areas 43 of respective ones of the sheets of density adjustment paper 40A to 40D output from printers A to D, respectively. Further, if the density adjustment paper is paper 40A that has been output from printer A, the identification information (color) recorded in the identification information area 45 will be red; if the density adjustment paper is paper 40B that has been output from printer B, the identification information recorded in the identification information area 45 will be blue; if the density adjustment paper is paper 40C that has been output from printer C, the identification information recorded in the identification information area 45 will be green; and if the density adjustment paper is paper 40D that has been output from printer D, the identification information recorded in the identification information area 45 will be black. By detecting the color recorded in the identification information area 45, it can be determined from which printer among printers A to D the output was obtained.

The user sets the sheets of density adjustment paper 40A to 40D that have been output from the printers A to D, respectively, in the densitometer 1 in order one sheet at a time along the loading guide area 42 on each of the sheets of density adjustment paper 40A to 40D (step 51 in FIG. 5). Assume that the density adjustment paper 40A is set in the densitometer 1 first. The densitometer 1 reads the color (e.g., red) that has been recorded in the output-timing information area 43 of density adjustment paper 40A, the color (gray) that has been recorded in the density measurement area 44 and the color (red) that has been recorded in the identification information area 45 (step 52 in FIG. 5). Data representing each of these colors is transmitted from the densitometer 1 to the control apparatus 10 (step 53 in FIG. 5).

Upon receiving the data transmitted from the densitometer 1, the control apparatus 10 checks to determine whether the sheet of density adjustment paper 40A that was set in the densitometer 1 was printed out last (step 63 in FIG. 6). This determination is made based upon the data representing the output-timing information that was transmitted from the densitometer 1 and the data representing the output-timing information that has been stored in the work memory 18. If the color indicated by the data representing the output-timing information that was transmitted from the densitometer 1 and the color indicated by the data representing the output-timing information that has been stored in the work memory 18 match ("YES" at step 63 in FIG. 6), then it is decided that the sheet of density adjustment paper 40A that was set in the densitometer 1 was printed out last. If the colors do not match ("NO" at step 63 in FIG. 6), then it is decided that sheet of density adjustment paper 40A that was set in the densitometer 1 was not one printed out last. Accordingly, the control apparatus 10 presents an alert message on the display screen of the display unit 6 so as to prompt the user to set the sheet of density adjustment paper 40A that was output last (step 64 in FIG. 6). The sheet of density adjustment paper 40A that was output last would be set in the densitometer 1 by the user.

Adjustment of printer density can be performed using the sheet of density adjustment paper 40A that was output last. As a result, even if the color that was recorded on the density adjustment paper 40A should happen to change owing to the passage of time, a color correction can be made in comparatively accurate fashion. Further, four different colors are recorded in the output-timing information area 43 in dependence upon the timing at which the paper was printed out. By observing the color that has been recorded in the area 43, the user can ascertain the particular timing at which the density adjustment paper was output.

If the sheet of density adjustment paper 40A that was output last has been set in the densitometer 1, the control apparatus 10 generates density adjustment data, which is for correcting the density of printer A, from the density measurement data that has been transmitted from the densitometer 1 (step 65 in FIG. 6). It goes without saying that in a case where the density measurement data represents a predetermined appropriate density, no adjustment of printer density is carried out. The density adjustment data is transmitted to the printer specified by the identification information data transmitted from the densitometer 1 (step 66 in FIG. 6). For example, if the density measurement data read from the density adjustment paper 40A has been transmitted to the control apparatus 10, then the density adjustment data will be transmitted to printer A.

If density adjustment data received by a printer among the printers A to D is density adjustment data transmitted to the address of this printer ("YES" at step 72 in FIG. 7), then the printing mechanism 32 of this printer is controlled based upon this density adjustment data, whereby the density of this printer is adjusted (step 73 in FIG. 7).

The sheets of density adjustment paper 40A to 40D are set in the densitometer 1 one after another and the densities of the printers A to D are adjusted, as described above, until all of the printers A to D have made a density adjustment. Even though there are a plurality of printers A to D and a plurality of sheets of the density adjustment paper 40A to 40D produced as outputs, the density of each of the plurality of printers A to D can be adjusted without the user needing to be aware of which printer of printers A to D produced the output. Further, since output-timing information for identifying the timing at which the paper was output is recorded on the density adjustment paper, the density adjustment can be carried out using the latest density adjustment paper.

In the above-described embodiment, the output-timing information recorded in the output-timing information area 43 and the identification information recorded in the identification information area 45 of each of the sheets of density adjustment paper 40A to 40D is color. However, information other than color, e.g., characters or bar codes, may be used. If characters or bar codes have been recorded on the sheets of density adjustment paper 40A to 40D, then the densitometer would be provided with a scanner for reading characters of bar codes.

As many apparently widely different embodiments of the present invention can be made without departing from the spirit and scope thereof, it is to be understood that the invention is not limited to the specific embodiments thereof except as defined in the appended claims.

What is claimed is:

1. A printing system comprising a plurality of printers, a densitometer and a printer control unit, wherein each printer of said plurality of printers includes:

a printer head for printing at a density that is based upon print-density adjustment data applied thereto; and a first controller for controlling said printer head so as to print density adjustment paper that includes unique identification information, which is different from that of other printers among said plurality of printers, and density measurement information;

said densitometer includes:

a first reading unit for reading the identification information on the density adjustment paper that has been output from said printer and outputting data representing the read identification information; and a second reading unit for reading the density measurement information on the density adjustment paper that has been output from said printer and outputting data representing a read density measurement value; and said printer control unit includes:

a generating unit for generating print-density adjustment data based upon density measurement data that has been output from said second reading of said densitometer; and a second controller for applying the print-density adjustment data generated by said generating unit to a printer, which is specified by identification information data that has been output from said first reading unit, from among said plurality of printers.

2. The system according to claim 1, wherein said first controller of each of the printers of said plurality of printers controls said printer head so as to print density adjustment paper that includes printer collateral information in addition to the identification information and density measurement information;

said densitometer includes a third reading unit for reading the printer collateral information of the density adjustment paper that has been output from said printer, and outputting data representing the read printer collateral information; and said printer control unit includes an alert device for issuing an alert when printer collateral information that has been output from said third reading unit of said densitometer is not printer collateral information that was obtained from density adjustment paper printed last.

* * * * *